United States Patent
Doradla et al.

(10) Patent No.: US 7,657,239 B2
(45) Date of Patent: Feb. 2, 2010

(54) METHOD FOR CONSERVING ENERGY IN A MULTIMODE COMMUNICATION DEVICE

(75) Inventors: Anil Doradla, Austin, TX (US); David Wolter, Austin, TX (US); J. Bradley Bridges, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 597 days.

(21) Appl. No.: 11/296,721

(22) Filed: Dec. 6, 2005

(65) Prior Publication Data

US 2007/0129092 A1    Jun. 7, 2007

(51) Int. Cl.
H04B 1/18    (2006.01)

(52) U.S. Cl. .............. 455/161.1; 455/161.3; 455/343.2; 455/41.2; 709/227; 370/328

(58) Field of Classification Search .............. 455/161.1, 455/161.3, 343.2, 343.5, 41.2; 709/227, 709/232; 370/328, 338
See application file for complete search history.

(56) References Cited

U.S. PATENT DOCUMENTS

| | | | | |
|---|---|---|---|---|
| 7,024,155 B2 * | 4/2006 | Gosieski, Jr. | ............... | 455/3.01 |
| 7,133,743 B2 * | 11/2006 | Tilles et al. | ................ | 700/242 |
| 7,143,171 B2 * | 11/2006 | Eriksson et al. | ............ | 709/227 |
| 7,231,233 B2 * | 6/2007 | Gosieski, Jr. | ............. | 455/569.1 |
| 2002/0059434 A1 | 5/2002 | Karaoguz et al. | | |
| 2002/0184418 A1 | 12/2002 | Blight | | |
| 2003/0114158 A1 * | 6/2003 | Soderbacka et al. | ......... | 455/436 |
| 2004/0203873 A1 | 10/2004 | H. Gray | | |
| 2005/0043068 A1 | 2/2005 | Shohara et al. | | |
| 2005/0113021 A1 * | 5/2005 | Gosieski et al. | ............ | 455/3.06 |
| 2005/0113058 A1 * | 5/2005 | Gosieski, Jr. | ................ | 455/345 |
| 2005/0113136 A1 * | 5/2005 | Gosieski, Jr. | ............. | 455/556.1 |
| 2005/0130717 A1 * | 6/2005 | Gosieski et al. | .......... | 455/575.2 |
| 2005/0159153 A1 | 7/2005 | Mousseau et al. | | |
| 2006/0063560 A1 * | 3/2006 | Herle | ...................... | 455/552.1 |
| 2006/0206582 A1 * | 9/2006 | Finn | .......................... | 709/217 |
| 2007/0147311 A1 * | 6/2007 | Brok | .......................... | 370/335 |
| 2008/0089287 A1 * | 4/2008 | Sagfors et al. | .............. | 370/331 |

* cited by examiner

*Primary Examiner*—Matthew D Anderson
*Assistant Examiner*—Minh D Dao
(74) *Attorney, Agent, or Firm*—Ed Guntin; Akerman Senterfitt LLP

(57) ABSTRACT

A system and methods (300, 400) are disclosed for conserving energy in a multimode communication device (106). A system that incorporates teachings of the present disclosure may include, for example, a communication device having a multimode wireless transceiver (202) for accessing a plurality of wireless access technologies (103), and a controller (214) for managing operations of the multimode wireless transceiver. The controller is programmed to enable (300) scanning for a select one of the wireless access technologies when the communication device is near a known location of a wireless access point. An embodiment for a network management system (100) is also disclosed.

7 Claims, 4 Drawing Sheets

METHOD FOR CONSERVING ENERGY IN A MULTIMODE COMMUNICATION DEVICE

FIELD OF THE DISCLOSURE

The present disclosure relates generally to energy conservation methods, and more specifically to a method for conserving energy in a multimode wireless communication device.

BACKGROUND

Generally, multimode communication devices (herein referred to as "MCD") such as cell phones with WiFi capability scan portions of the frequency spectrum to determine when it may be appropriate to switch between access technologies. Often only one of these access technologies is available in the vicinity of the MCD. As result, MCDs often consume unnecessary energy while scanning for an unavailable access point. A need therefore arises for a method to conserve energy in an MCD.

DETAILED DESCRIPTION

Embodiments in accordance with the present disclosure provide a method for conserving energy in a multimode wireless communication device.

In a first embodiment of the present disclosure, a communication device has a multimode wireless transceiver for accessing a plurality of wireless access technologies, and a controller for managing operations thereof. The controller is programmed to enable scanning for a select one of the wireless access technologies when the communication device is near a known location of a wireless access point, wherein prior to the enabling step the select one of the access technologies was disabled.

In a second embodiment of the present disclosure, a network management system (NMS) has a communications interface for exchanging messages with communication devices capable of accessing a plurality of wireless access technologies, and a controller for managing operations of the communications interface. The controller is programmed to assist a communication device in locating one among a plurality of wireless access points to conserve energy in the communication device.

In a third embodiment of the present disclosure, a computer-readable storage medium operates in a communication device and has computer instructions for conserving energy by scanning for a select one of a plurality of wireless access technologies only when the communication device is near a known location of a wireless access point.

In a fourth embodiment of the present disclosure, a computer-readable storage medium operates in the NMS and has computer instructions for assisting a multimode communication device to conserve energy according to location information corresponding to a plurality of wireless access points.

Figure 1:
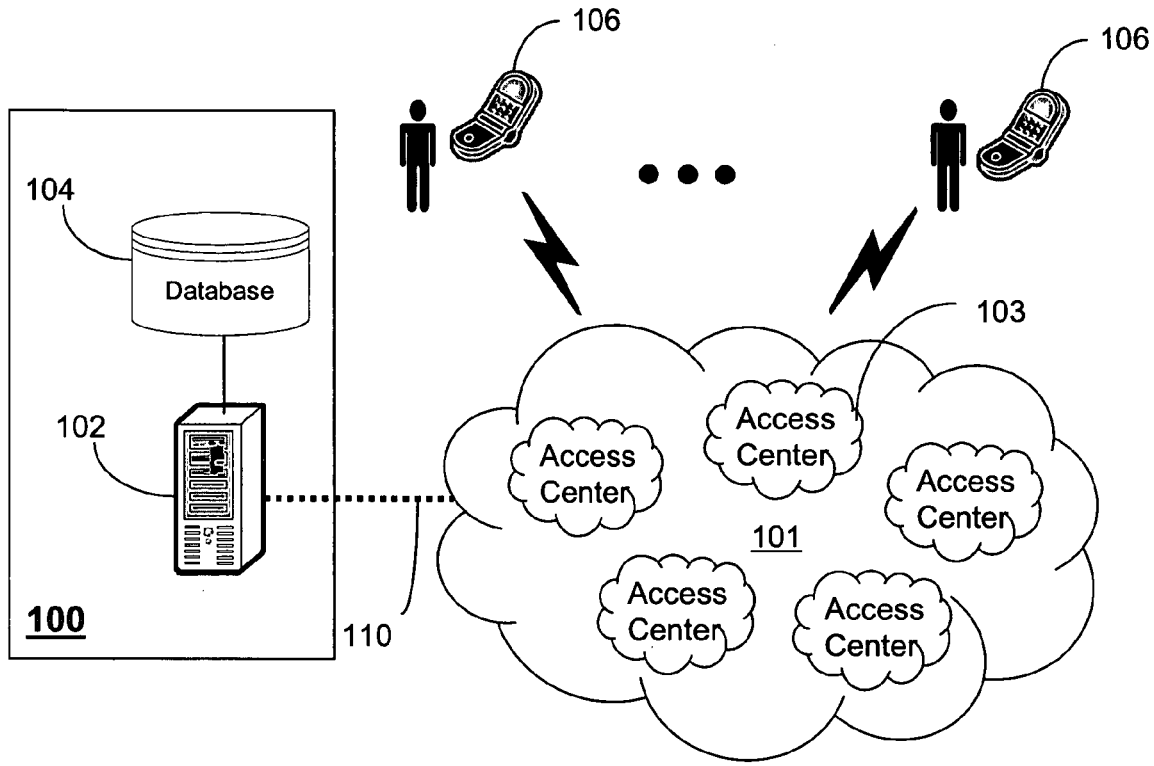
FIG. 1 is a block diagram of a network management system (NMS) and a number of multimode communication devices (MCDs) operating in a communication system according to teachings of the present disclosure.

FIG. 1 is a block diagram of a network management system (NMS) 100 and multimode communication devices (MCDs) 106 operating in a communication system 101 according to teachings of the present disclosure. The NMS 100 comprises a communications interface 110, a memory 104 and a controller 102. The communications interface 110 utilizes wired or wireless communications technology for interfacing to the communication system 101. The communications interface 110 can be represented by a circuit-switched and/or a packet-switched interface. The controller 102 can utilize computing technology such as a scalable server to manage operations of the communications interface 110 and a database for storing network information that includes among other things location information corresponding to a plurality of access technology centers 103 scattered throughout the communication system 101. The NMS 100 can also operate common applications such as a CRM (Customer Relationship Management) system for managing customer accounts, and information relating to network elements of the communication system 101.

Figure 2:
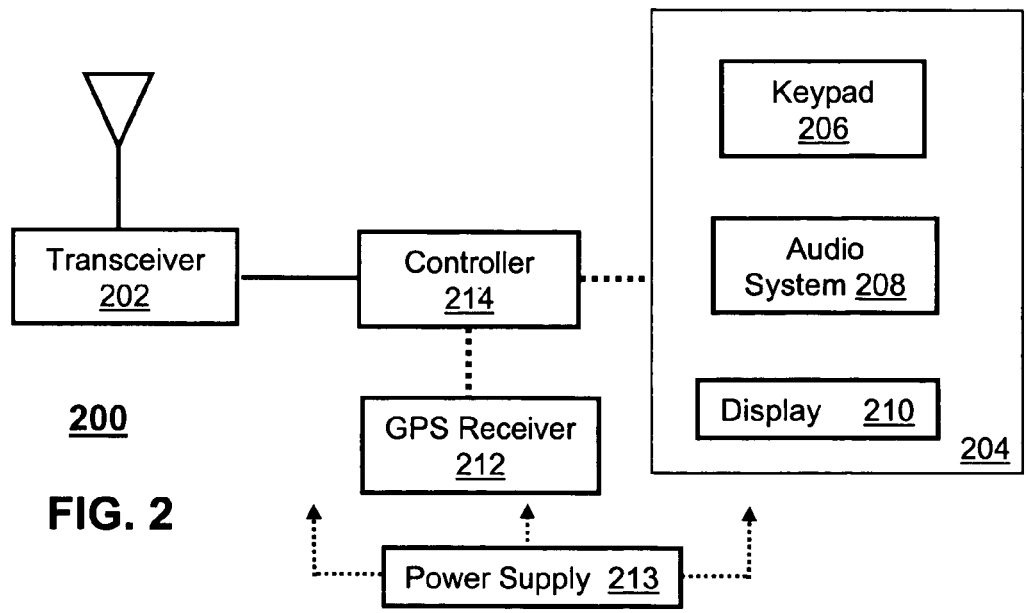
FIG. 2 is a block diagram of the MCD of FIG. 1 according to teachings of the present disclosure.

An MCD 106 is a wireless device capable of communicating with any number of wireless access technologies for data and/or voice communications. Common access technologies supported by the MCD include cellular (CDMA, GSM, TDMA, UMTS, etc.), WiFi, and WiMax, just to mention a few. The MCD 106 can support wireless circuit-switched voice communications or packet-switched voice communications such as voice over IP (VoIP). FIG. 2 depicts a block diagram of the MCD 106 according to teachings of the present disclosure. The MCD 106 can comprise a multimode wireless transceiver 202 (herein referred to as a "transceiver"), and a controller 214 for controlling operations thereof. The transceiver 202 utilizes common multimode wireless technology to support end user communications by way of the access technologies described above. In a supplemental embodiment, the MCD 106 can further include a user interface (UI) element 204, and a GPS (Global Positioning System) receiver 212. The UI element 204 can include among other things a keypad 206 with selectable navigation and depressible keys, an audio system 208 for conveying and intercepting audio messages from an end user, and a display 210 for conveying images. Each of these embodiments can serve as a user interface for manipulating selectable options provided by the MCD 106, and for conveying messages to the end user according to the present disclosure.

The GPS receiver 212 utilizes common technology for receiving signals from a constellation of satellites for detecting a location of the MCD 106. The controller 214 can include a computing device such as a microprocessor, or digital signal processor (DSP) with associated storage devices such as RAM, ROM, DRAM, Flash, and other common memories. To support mobility, the MCD 106 can include a portable power supply 213 with technology for supplying energy to the components of the MCD 106 from one or more rechargeable batteries, and for recharging said batteries.

The communication system 101 can include a number of wireless access technologies such as cellular (GSM, CDMA, UMTS, EVDO, etc.), WiFi, WiMax, Bluetooth™, software defined radio (SDR), among others, for communicating with the MCDs 106. For the present illustration, it will be assumed that the MCD 106 is a dual-mode device supporting GSM and WiFi access technologies. The access centers 103 representing, for example, retailers (such as Starbucks™) can be scattered throughout the communication system 101 as WiFi centers with one or more wireless access points (WAPs) at each center. These centers 103 thus provide the MCDs 106 alternate or supplementary communications means to GSM. End users of the MCDs 106 can therefore switch between access technologies when it may be convenient or cost effective to do so. As noted above WAPs can represent any form of wireless access technology. For convenience and without limiting the scope of the present disclosure, the WAPs described below will be assumed to be WiFi only.

Figure 3:
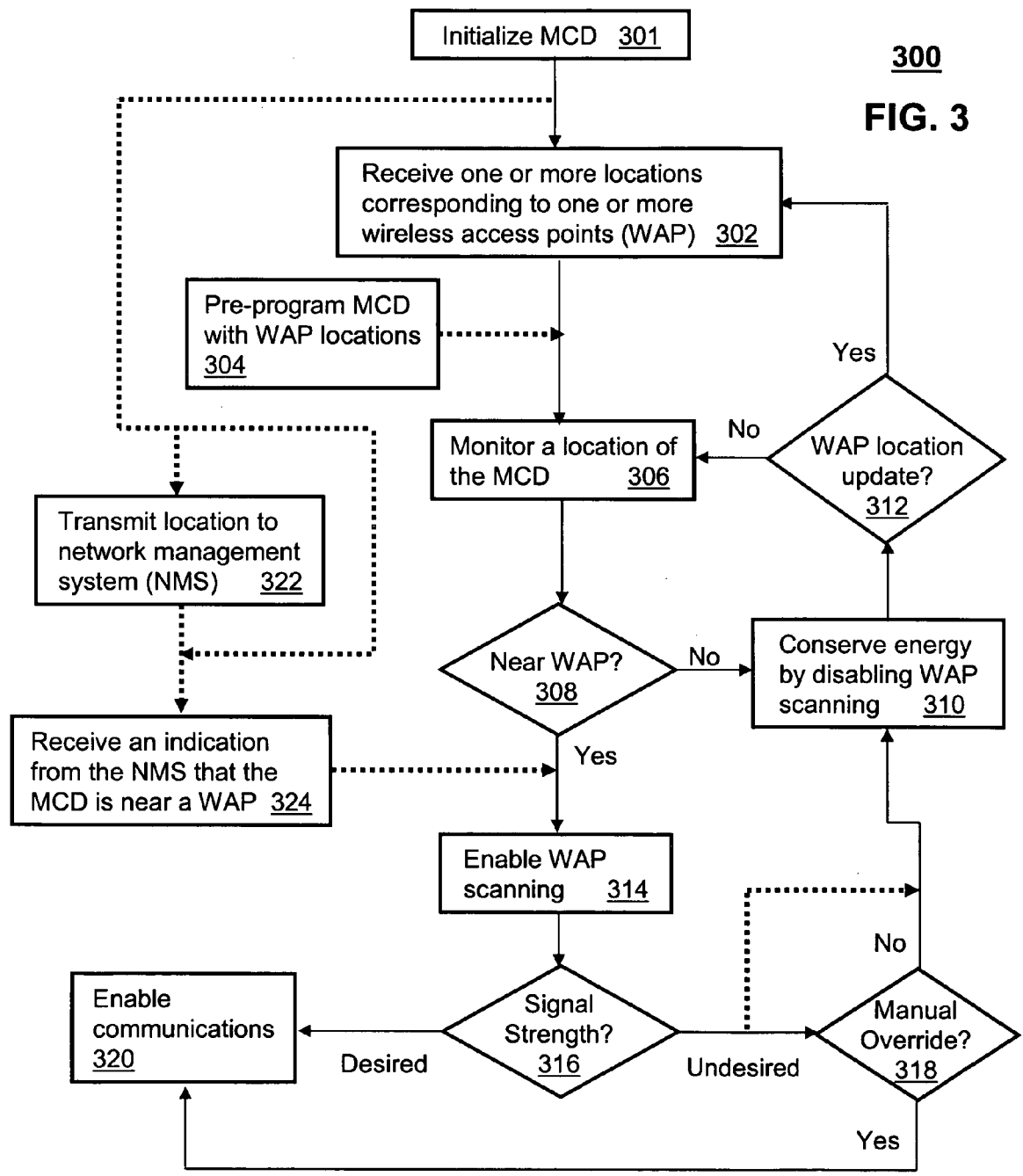
FIG. 3 depicts a flowchart of a method operating in the MCD according to teachings of the present disclosure.

FIG. 3 depicts a flowchart of a method 300 operating in the MCD 106 according to teachings of the present disclosure. Method 300 begins with step 301 where the controller 214 can be programmed to initialize the components of the MCD 106. The initialization step can include among other things programming the transceiver 202 by way of the controller 214 to camp primarily on the GSM network of the communication system 101, while disabling the process of scanning for one or more wireless access points (WAPs) until otherwise directed by the controller 214. As a result of the initialization step, the MCD 106 does not consume unnecessary energy when a WAP device is not within the communication range of the MCD 106.

In step 302 the controller 214 can be programmed to receive one or more locations corresponding to one or more wireless access points (WAP) located at the access centers 103. This step can be accomplished by way of a wireless message received from the NMS 100 (e.g., an SMS-Short Message System) over the GSM network of the communication system 101, during a WiFi connection to one of the access centers 103, from a website managed by the NMS 100 while the MCD 106 is coupled to a computer for provisioning purposes, or through any other suitable means for receiving location information. Alternatively, the storage portion of the controller 214 (e.g., Flash memory) can be pre-programmed with the WAP locations, and later updated wirelessly or by the other methods described above.

Where the MCD 106 has a location receiver such as the GPS receiver 212, the controller 214 can proceed to step 306 where it monitors the location of the MCD 106 periodically. In step 308, the controller 214 compares the monitored location to the one or more locations provided in steps 302 or 304. If the controller 214 detects the MCD 106 is near one or more of the WAP locations, it proceeds to step 314 where it enables the transceiver 202 to begin scanning for a WAP device. If the signal strength detected in step 316 by the transceiver 202 (using, for example, RSSI—Receive Signal Strength Indication) is desirable, then the controller 214 proceeds to step 320 where it enables communications using the alternate wireless network enabled by the WAP. The communications step 320 can begin, for example, with a notification submitted to the end user by way of the UI element 204 indicating that a WAP device has been detected. The notification can also show the availability of voice communications (e.g., VOIP) and/or data communications over the Internet. The end user can choose to initiate by way of the UI element 204 a voice or data call as desired.

If, on the other hand, the controller 214 determines in step 308 that the MCD 106 is not within the communication range of a WAP, then the controller 214 proceeds to step 310 where it continues to conserve energy by disabling the process to scan for WAP devices. If the controller 214 detects in step 316 that the signal strength is undesirable, then the controller 214 proceeds to step 318 where it checks for a manual override from the end user of the MCD 106. If the end user wishes to force a scan, the controller proceeds to step 320 where it enables communications with the WAP as described above.

If the end user does not wish to force a scan, the controller 214 proceeds to step 310 to conserve energy. Alternatively, the controller 214 can also be programmed to proceed from step 316 to step 310. While in step 310, the MCD 106 remains on a GSM channel in stand-by mode waiting to receive voice or data messages. In step 312, the controller 214 can be further programmed to check for WAP location updates from the NMS 100 over the GSM network of the communication system 101, or by way of a provisioning device such as a computer connected to the NMS 100 by way of the Internet or other communication means. If there are no updates, the controller 214 proceeds to step 306 to restart the monitoring process. Otherwise, it proceeds to step 302 to receive the update.

In an alternate embodiment, the MCD 106 may not have been provisioned with the locations of WAPs in the communication system 101. Under this use case, the controller 214 can be programmed to proceed from step 301 to step 322 where it transmits periodically the location of the MCD 106 to the NMS 100 as monitored by the GPS receiver 212. When the NMS 100 detects that the MCD 106 is near a WAP device, it transmits to the MCD 106 an indication of said state, which in turn is received in step 324 by the transceiver 202 as directed by the controller 214. The controller 214 then proceeds to step 314 as described above.

In yet another alternate embodiment, the MCD 106 may not have a GPS receiver 212. Under this embodiment, the NMS 100 can monitor the location of the MCD 106 by means such as triangulation. Accordingly, the controller 214 of the MCD 106 can be programmed to proceed from step 301 to step 324. Thus, when an indication is received from the NMS 100 that the MCD 106 is near a WAP device, the controller 214 proceeds to step 314 and the series of steps that follow as described earlier.

Figure 4:
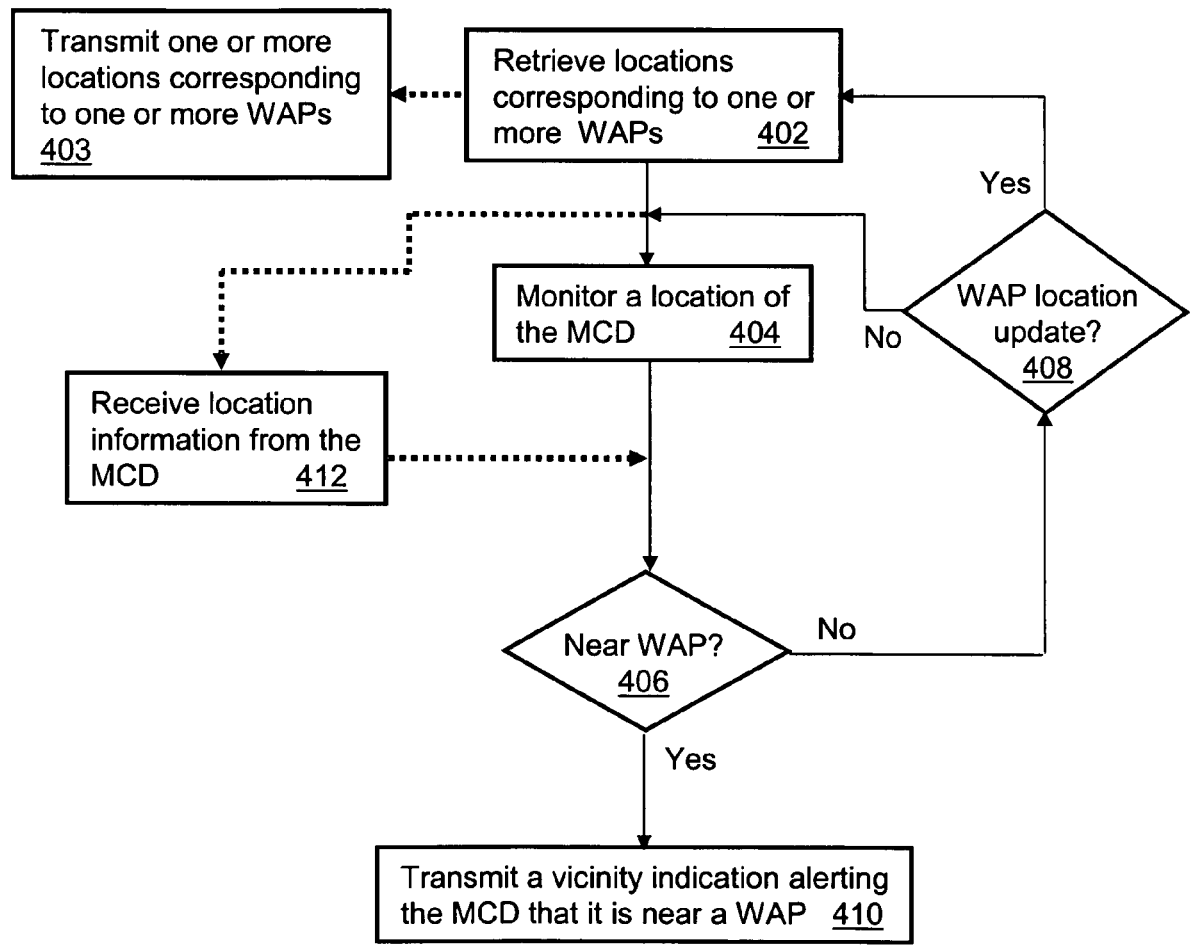
FIG. 4 depicts a flowchart of a method operating in the NMS according to teachings of the present disclosure.

FIG. 4 depicts a flowchart of a method 400 operating in the NMS 100 that mirrors some of the functions described in FIG. 3 according to teachings of the present disclosure. Method 400 begins with step 402, where the controller 102 of the NMS 100 can be programmed to search and retrieve one or more locations corresponding to one or more of the WAPs. The controller 102 can search its database 104, or another remote source that includes location information corresponding to the WAPs. In an embodiment, where the MCD 106 has a GPS receiver 212, the controller 102 of the NMS 100 can proceed to step 403 where it transmits the one or more locations of the WAPs found in step 402. From this point on, the MCD 106 performs its own power conservation process as described by method 300.

Alternatively, if the MCD 106 has a GPS receiver 212, but it is not provisioned with location information, the controller 102 can proceed to step 412 where it receives location information from the MCD 106. If in step 406 the controller 102 detects that the location received is near a known WAP device, then it proceeds to step 410 where it transmits a vicinity indication alerting the MCD 106 that it is near a WAP. If, on the other hand, the location given by the MCD 106 is not within the communication range of a WAP, the controller 102 proceeds to step 408 where it checks for WAP location updates. Updates can occur as the result of new or modified distributions of the access centers 103 in the communication system 101 as said network evolves. These updates can be managed by a CRM operating in the NMS 100 or by way of another remote source coupled to the NMS 100. If there are no updates, the controller 102 proceeds to steps 404 or 412 and repeats the foregoing process. Otherwise, it proceeds to step 402 and retrieves the updated location information.

If the MCD 106 does not have a GPS receiver 212, the controller 102 can proceed from step 402 to step 404 where it monitors the location of the MCD 106 by common means such as GSM triangulation using three or more references (such as a GSM base station towers) to approximate the location of the MCD 106. When the controller 102 detects in step 406 that the MCD 106 is near one or more of the WAP devices, it proceeds to step 410 to transmit said indication. Otherwise, it proceeds to step 408 to repeat the monitoring process and/or retrieve updated WAP locations.

As would be evident to an artisan with ordinary skill in the art, the foregoing embodiments of the present disclosure provide a variety of methods for conserving energy in an MCD 106. In particular, the foregoing methods describe a means for limiting the time an MCD 106 spends scanning for alternate access technologies thus conserving energy. It would be further apparent to said artisan that this method can be applied to any combination of access technologies not just those presented herein. The claims described below therefore provide the clearest understanding of the scope of embodiments possible.

Figure 5:
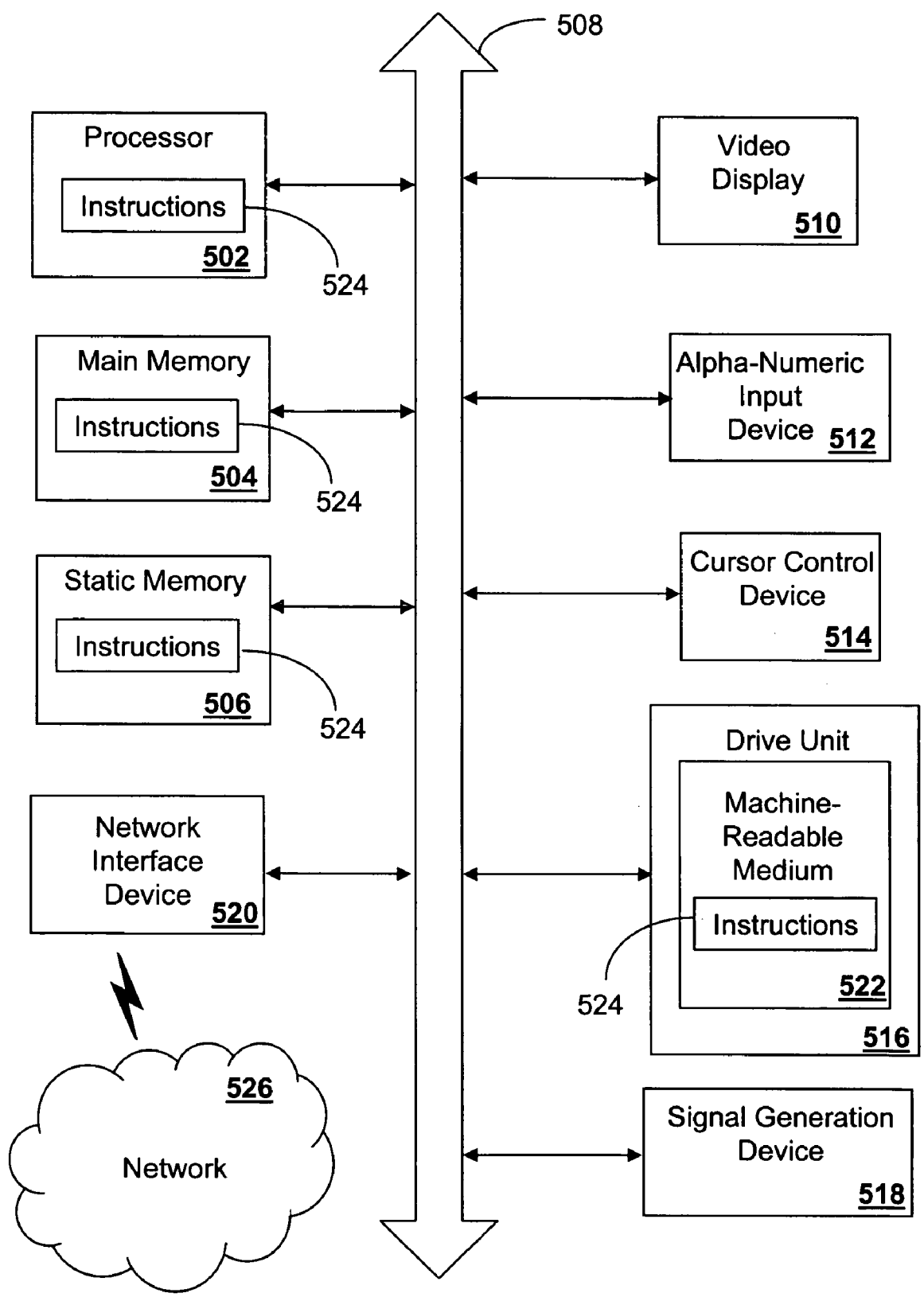
FIG. 5 is a diagrammatic representation of a machine in the form of a computer system within which a set of instructions, when executed, may cause the machine to perform any one or more of the methodologies discussed herein.

FIG. 5 is a diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and/or magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g.; TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
   a multimode wireless transceiver for accessing a plurality of wireless access technologies; and
   a controller for managing operations of the multimode wireless transceiver, wherein the controller is programmed to enable the multimode wireless transceiver to scan a select one of the wireless access technologies when the communication device detects that it is near a known location of a wireless access point, wherein prior to the enabling step the multimode wireless transceiver is disabled to scan the select one of the access technologies in order to conserve energy,
   wherein the controller is programmed to:
   monitor a location of the communication device;
   detect that the communication device is near the known location of the wireless access point; and
   enable scanning in response to said detection, and
   wherein when the controller detects that a signal strength is undesirable, the controller is programmed to check for a manual override from an end user of the communication device, and when the end user forces a scan, the controller enables communications with the wireless access point.

2. The communication device of claim 1, wherein the controller is programmed to conserve energy while the communication device is out of a communication range of the wireless access point.

3. A network management system (NMS), comprising:
   a communications interface for exchanging messages with communication devices capable of accessing a plurality of wireless access technologies; and
   a controller for managing operations of the communications interface, wherein the controller is programmed to assist a communication device in locating one among the plurality of wireless access points to conserve energy in the communication device, wherein the controller is programmed to:
   monitor a location of the communication device; and
   transmit a vicinity indication to the communication device when it is near a select one of the plurality of wireless access points for enabling in the communication device a process for scanning said wireless access point, and
   wherein when the controller detects that a signal strength is undesirable, the controller is programmed to check for a manual override from an end user of the communication device, and when the end user forces a scan, the controller enables communications with said wireless access point.

4. The NMS of claim 3, wherein the controller is programmed to transmit to the communication device a plurality of locations of a corresponding plurality of wireless access points for conserving energy in the communication device.

5. A computer-readable storage medium in a communication device, comprising computer instructions for conserving energy by scanning for a select one of a plurality of wireless access technologies only when the communication device is near a known location of a wireless access point, and comprising computer instructions for:
   monitoring a location of the communication device;
   detecting that the communication device is near the known location of the wireless access point;
   scanning for the wireless access point in response to said detection;
   locating the communication device by triangulation in a communication system;
   detecting that a signal strength is undesirable;
   checking for a manual override from an end user of the communication device; and
   when the end user forces a scan, enabling communications with said wireless access point.

6. The storage medium of claim 5, comprising computer instructions for conserving energy while the communication device is out of a communication range of the wireless access point.

7. The storage medium of claim 5, comprising computer instructions for enabling communications with the wireless access point upon detecting a desired signal strength.

* * * * *